Nov. 19, 1946.   F. E. FREY   2,411,256
CONVERSION OF HYDROCARBONS
Filed Nov. 13, 1942
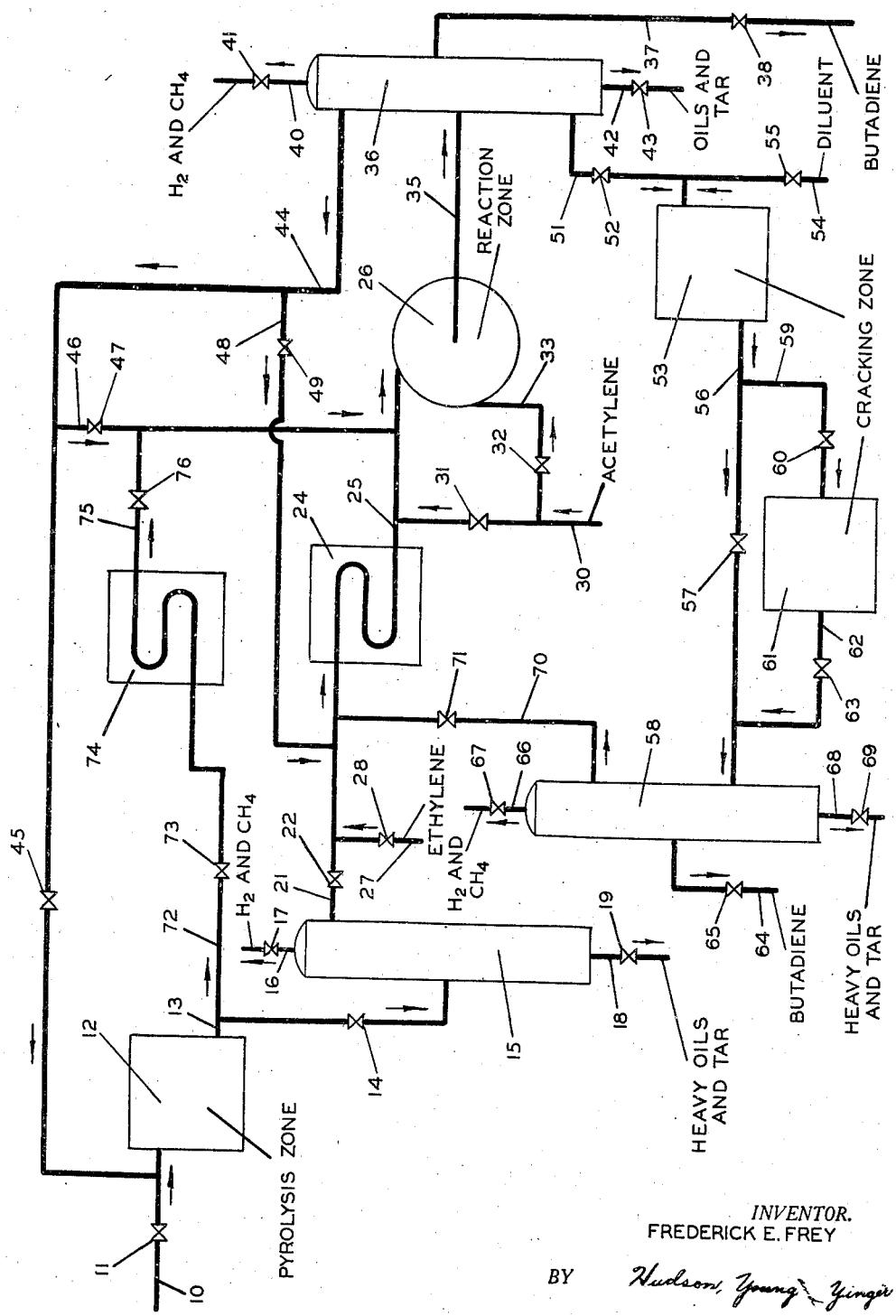
INVENTOR.
FREDERICK E. FREY
BY *Hudson, Young & Yinger*
ATTORNEYS Patented Nov. 19, 1946

2,411,256

UNITED STATES PATENT OFFICE 2,411,256

CONVERSION OF HYDROCARBONS

Frederick E. Frey, Bartlesville, Okla., assignor to Phillips Petroleum Company, a corporation of Delaware Application November 13, 1942, Serial No. 465,495

2 Claims. (Cl. 260—680)

This invention relates to the production of diolefin hydrocarbons from more saturated hydrocarbons of two to four carbon atoms per molecule. It is especially applicable to the production of low-boiling diolefins, particularly butadiene and pentadienes from paraffin and olefin hydrocarbons.

Butadiene and related diolefin hydrocarbons are well known. They have been produced in a number of ways, including vapor-phase cracking of oils, pyrolysis of organic compounds, dehydration of lower aliphatic alcohols and of butylene glycol, elimination of hydrogen halide from dihalides of paraffin hydrocarbons, dehydrogenation of olefin hydrocarbons, and other more or less involved chemical processes such as the synthesis of butadiene from phenol and the co-reaction of acetylene and ethylene to form butadiene. The last-mentioned procedure has not found wide commercial application because the yields of desired product were made relatively low by concomitant reactions that formed excessive amounts of other products stable under the prevailing operating conditions.

I have now found that I can successfully produce substantial yields of low-boiling diolefins, such as butadiene and pentadienes, from relatively more saturated hydrocarbons of two to four carbon atoms per molecule by a process which involves cracking or pyrolyzing the more saturated hydrocarbons and effecting combination of portions of the cracked products in a co-reaction step. The more saturated hydrocarbons are those which are less unsaturated than the diolefins; i. e.) the paraffins, ethane, propane, n. butane, isobutane, and the olefins, ethylene, propylene, the butylenes, etc. In one specific embodiment, my invention comprises cracking a charge stock composed predominantly of saturated hydrocarbons of two to four carbon atoms per molecule under conditions adapted to effect production of optimum yields of ethylene and acetylene, treating the resulting mixture to obtain a fraction which comprises ethylene and acetylene in a suitable ratio, subjecting said fraction to reaction in a turbulence chamber or multi-point reactor under conditions favorable for the production of butadiene, and separating and recovering the desired butadiene so produced. Of the butadiene-depleted material, a fraction comprising unreacted ethylene and/or acetylene may be advantageously recycled to the reaction zone to increase the yield of butadiene, and a fraction comprising relatively heavy by-products may be advantageously cracked to increase further the yield of butadiene. The diolefin-forming reaction, as well as the cracking steps, may be carried out in the presence or absence of catalysts.

Acetylene can be produced by pyrolysis of relatively more saturated hydrocarbons at particularly high temperatures with a yield of 5 to 10 weight per cent and higher of the total products. At the time and temperature levels suited for effecting juncture with ethylene to produce butadiene, there is a strong tendency for acetylene to undergo auto-polymerization. This reaction takes place much more rapidly than the auto-polymerization of ethylene at the same time-temperature-partial pressure conditions. By supplying, in accordance with my invention, additional acetylene to the reaction zone as it is consumed, a total addition of many times the desired steady state concentration may be made with resultant increase in the percentage of butadiene to 6 to 10 per cent by weight or more, referred to total ethylene plus acetylene supplied for the reaction step. A concentration of butadiene results which is substantially in excess of that obtained by exposure of a stream of reactants to one or to two consecutive pyrolytic conversion steps, in which all reactants, in admixture, enter and pass through a conversion zone or zones.

My invention further comprises various preferred methods for obtaining the desired ratio of hydrocarbons of the olefin series to hydrocarbons of the acetylene series, and effecting reaction to obtain substantial production of the desired product.

An object of this invention is to provide an improved process for the manufacture of diolefins. Another object of this invention is to provide an improved process for the manufacture of diolefin hydrocarbons from paraffin and olefin hydrocarbons having a lesser number of carbon atoms per molecule. Another object of this invention is to provide such a process which involves a combination of cracking and co-reaction steps. Still another object of this invention is to provide an improved process for the manufacture of butadiene from ethylene and acetylene. Still another object is to provide an improved process for the manufacture of pentadiene from propylene and acetylene. Still another object is to provide an improved process for the production of diolefins from an olefin and acetylene. Another object is to provide such a process in which the per-pass conversion of the olefin and acetylene to diolefins is higher than heretofore possible.

Other objects and advantages of the invention will be apparent to those skilled in the art from the following description and the accompanying drawing.

I have found that low-boiling diolefin hydrocarbons, such as butadiene and pentadienes, may be produced in high yields from more saturated hydrocarbons of two to four carbon atoms per molecule by reacting gaseous unsaturated hydrocarbons of the ethylene series and of the acetylene series under selected reaction conditions that minimize side reactions. More specifically, substantial yields of butadiene (or pentadiene) are obtained by reacting a mixture comprising ethylene and acetylene (or propylene and acetylene) in a molal ratio of from about 10:1 to 50:1 at a suitable reaction temperature in a turbulence chamber of the type described in my copending application, Serial No. 373,047, filed January 3, 1941, now U. S. Patent 2,330,118, issued September 21, 1943. The mixture is introduced at a high linear velocity in a direction and manner such that a vigorous turbulent circulation of the reaction mixture within the chamber is established and maintained, whereby rapid mixing and dilution of the incoming hydrocarbons with the already present circulating and reacting contents of the chamber is effected. By effecting such rapid mixing and dilution of the incoming hydrocarbons, the co-reaction of ethylene and acetylene to form butadiene is favored, and the formation of polymers of ethylene and/or of acetylene is minimized. Reaction temperatures may be in the range of 550 to 900° C. at pressures of 0.2 to 2 atmospheres, or in the range of 300 to 550° C. at higher pressures, up to about 20 atmospheres.

Although the gaseous unsaturated hydrocarbons of the ethylene series and of the acetylene series used for the formation of low-boiling diolefins may be obtained from any source or produced by any of various methods known to the art, I prefer to crack hydrocarbons of two to four carbon atoms per molecule, or mixtures thereof, which are more saturated than the diolefin hydrocarbons, at temperatures in the range of 850 to 1500° C. and at pressures of 0.2 to 3 atmospheres for periods of time sufficient to yield ethylene and acetylene hydrocarbons in amounts of about 15 and 5 per cent by weight of the charge, respectively.

My invention will now be more specifically described in connection with the accompanying drawing, which is a diagrammatical flow diagram showing one mode of procedure for practicing my invention.

A hydrocarbon material more saturated than diolefin hydrocarbons and of two to four carbon atoms per molecule, which may be predominantly ethane, propane, butanes, or mixtures thereof, is introduced into the system through pipe 10 and is passed by way of valve 11 to pyrolysis zone 12. Pyrolysis zone 12 is heated by suitable heating units, or furnaces, or the like known to the art for effecting and maintaining pyrolysis or cracking of low-boiling hydrocarbons. (The hydrocarbon charge may be augmented by recycled material from pipe 44, controlled by valve 45.) The pyrolysis is preferably effected at 850 to 1500° C. and at 0.2 to 3 atmospheres, depending upon the composition of the charge stock; the reaction time is such as to convert about 1 to 5 per cent of the charge by weight to acetylene and about 15 per cent or more to ethylene. The resulting products are passed through pipe 13 and valve 14 to fractionating means 15, which may be any system of conventional fractional-distillation units suitable for separating the desired fractions. Hydrogen and methane are withdrawn through pipe 16 and valve 17, and any heavy oils and/or tar-like products are removed from the system through pipe 18 and valve 19. The remaining pyrolysis products, comprising the ethylene and the acetylene, are passed through pipe 21, controlled by valve 22, to heater 24, wherein they are heated to the temperature of incipient reaction or just slightly below a reaction-sustaining temperature. Then they are passed through pipe 25 to reaction zone 26, in which coreaction to form butadiene is effected.

I have found that, for optimum yields of butadiene, the ratio of ethylene to acetylene in the reacting gaseous mixture should be in the range of about 10:1 to 50:1 by volume. If the nature and composition of the material charged to the pyrolysis zone or the conditions of the reaction are such that the desired ratio of ethylene to acetylene is not directly obtained, additional quantities of the component which is deficient may be added. For example, ethylene or ethylene-rich gases may be added through pipe 27, controlled by valve 28, to pipe 21. Similarly, acetylene, or acetylene-rich gases, may be introduced through pipe 30, controlled by valve 31, to pipe 25; or the acetylene may be added directly to the reaction zone through valve 32 and pipe 33, provided that it is sufficiently rapidly mixed and diluted with the reacting contents therein.

Reaction zone 26 is preferably a turbulence chamber of the type described in my above-identified patent, 2,330,118. Briefly, it comprises a chamber of relatively large cross section, relative to the hydrocarbon stream, into which the reaction mixture is introduced at a high linear velocity and in a direction and manner such that a circulation of the contents of the chamber is established and maintained, thereby effecting a rapid mixing and dilution of the incoming hydrocarbons with the circulating and reacting contents. The rapid mixing and dilution of the incoming hydrocarbons with the circulating and reacting contents of the chamber through constant and turbulent circulation, which advantageously is augmented through multipoint-wise addition of the incoming hydrocarbons, minimizes formation of polymers of ethylene and/or of acetylene, and it simultaneously favors interaction of ethylene and acetylene to form butadiene.

Reaction within zone 26 is preferably effected at temperatures within the range of 550 to 900° C. and at pressures of 0.2 to 2 atmospheres. If higher pressure, up to about 20 atmospheres, are employed, the temperatures may be reduced to the range of 300 to 550° C. The average time of residence of the hydrocarbons in reaction zone 26 is preferably chosen so as to produce the optimum yield of butadiene. The reaction mixture is withdrawn substantially continuously, or intermittently at suitable time intervals if preferred, from reaction zone or chamber 26 through pipe 35, whose opening is preferably located at a central point in zone 26 so that short-circuiting of the reacting stream or streams is avoided. It is passed to separating means 36, wherein separation into desired fractions is effected by fractionation, absorption, extraction or other suitable means known to the art. One of these fractions comprises chiefly butadiene and is withdrawn through pipe 37 and valve 38. Methane and hydrogen may be removed through pipe 40 and valve 41; and any oils and/or tar-like by-products may be withdrawn from the system through pipe 42 and valve 43.

A fraction comprising chiefly unreacted normally gaseous hydrocarbons heavier than methane is passed from separating means 36 through pipe 44. If predominantly paraffinic, it is reintroduced to pyrolysis zone 12 by means of valve 45 and pipe 10 to be subjected to further cracking. If it comprises appreciable quantities of unreacted ethylene and/or acetylene, it may be passed from pipe 44 through pipe 46 and valve 47 to pipe 25, so that it is mixed with the stream of cracking products to reaction zone 26; however, it preferably is passed from pipe 44 through pipe 48 and valve 49 to pipe 21, so that it is mixed with the stream of cracking products before this stream is heated to a temperature of incipient reaction.

If desired, reaction products intermediate in carbon content and molecular weight between butadiene and heavy oils and/or tar, may be passed from separating means 36 through pipe 51, controlled by valve 52, to cracking zone 53. If desired, other hydrocarbons or diluent gases may be added through pipe 54, controlled by valve 55. Within zone 53, cracking is effected under conditions similar to those in zone 12, preferably at pressures of 0.1 to 2 atmospheres and temperatures in the range of 850–1500° C. depending upon the composition of the material being cracked. The products from cracking zone 53 are passed through pipe 56 and valve 57 to separating means 58; however, any desired portion of the products may be passed from pipe 56 through pipe 59, controlled by valve 60, to catalytic cracking zone 61, wherein further cracking is effected by catalysts such as alumina or bauxite, and the effluents are passed through pipe 62, controlled by valve 63, to separating means 58.

Within separating means 58, separation into desired fractions is effected by any suitable means. A butadiene fraction is withdrawn through pipe 64 and valve 65. Methane and hydrogen are removed through pipe 66 and valve 67. Heavy oils and/or tar are withdrawn through pipe 68 and valve 69. Intermediate products, other than the butadiene fraction, are passed through pipe 70, by means of valve 71, to pipe 21 to be passed with the fractionated pyrolysis products from fractionating means 15 through heater 24 to reaction zone 26.

In some cases, with suitable charge stock, it may be unnecessary to fractionate the pyrolysis products before reacting them under conditions favorable for production of butadiene. In such cases, the products formed in pyrolysis zone 12 will pass through pipe 72, controlled by valve 73, to heater 74, and then through pipe 75, controlled by valve 76, to pipe 25 and reaction zone 26.

Example I

Pure ethylene was cracked at atmospheric pressure by flowing it through a narrow quartz tube maintained at 854° C. by a salt bath. The flow rate was such that the residence time at reaction temperature was 0.16 second. Under these conditions 17.3 per cent of the ethylene reacted to yield a cracked product stream containing 3.95 per cent by weight of butadiene. The butadiene yield amounted to 22.8 per cent by weight of the ethylene reacted.

Example II

A mixture of ethylene and acetylene containing 3.24 per cent by weight of acetylene was reacted as outlined above at 881° C. and 0.139 second. The cracked products stream contained 2.0 per cent by weight of acetylene, 77.9 per cent of ethylene and 5.4 per cent of butadiene. The yield of butadiene was 26.9 per cent by weight of the $C_2$ hydrocarbons reacted.

Example III

A mixture of ethylene and acetylene containing 2.50 per cent by weight of acetylene was cracked at 871° C. and 0.229 second at 256 mm. of Hg absolute pressure. The cracked products contained 2.86 weight per cent of acetylene, 83.50 per cent of ethylene and 4.96 per cent of butadiene. The yield of butadiene was 36.5 per cent by weight of the $C_2$ hydrocarbons reacting.

Example IV

In a single-pass experiment made to show the effect of a large percentage of acetylene, a mixture of ethylene and acetylene containing 27.56 weight per cent of acetylene was cracked at 810° C. and atmospheric pressure in a quartz coil. The time of residence at reaction temperature was 1.218 seconds. The cracked products stream contained 9.81 weight per cent of acetylene, 53.86 per cent of ethylene and 4.55 weight per cent of butadiene. In addition the cracked products stream contained 24.04 weight per cent of $C_5$ and heavier products.

The invention may be practiced otherwise than as specifically described or illustrated, and many modifications and variations within the spirit and scope of it will be obvious to those skilled in the art.

I claim:

1. The process of making butadiene from ethylene and acetylene which comprises passing a mixture consisting of ethylene and acetylene in a molal ratio of from 10:1 to 50:1 through a reaction zone, maintaining the reaction mixture in said zone at a temperature of from 871 to 881° C. and under a pressure of from 0.2 to 2 atmospheres, holding the reaction mixture in said zone for a period of time within the range of from about 0.14 second to about 0.23 second, withdrawing the reaction mixture from said zone and recovering the butadiene content thereof as a product of the process.

2. The process of making butadiene from ethylene and acetylene which comprises passing a mixture consisting of ethylene and acetylene containing 3.24 per cent by weight of acetylene through a reaction zone, maintaining the reaction mixture in said zone at a temperature of 881° C. and at atmospheric pressure, holding the reaction mixture in said zone for 0.139 second, withdrawing the reaction mixture from said zone and recovering the butadiene content thereof as a product of the process.

FREDERICK E. FREY.